United States Patent
Ellis et al.

(10) Patent No.: US 10,174,785 B1
(45) Date of Patent: Jan. 8, 2019

(54) WHEEL BUSHING

(71) Applicant: Electrolux Home Products, Inc., Charlotte, NC (US)

(72) Inventors: Jeff Ellis, Kinston, NC (US); Dennis A. Poyner, Kinston, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

(21) Appl. No.: 15/813,433

(22) Filed: Nov. 15, 2017

(51) Int. Cl.
*F16C 13/00* (2006.01)
*A47L 15/50* (2006.01)

(52) U.S. Cl.
CPC .......... *F16C 13/006* (2013.01); *A47L 15/507* (2013.01)

(58) Field of Classification Search
CPC ...... F16C 13/006; F16C 13/02; F16C 13/024; A47L 15/50; A47L 15/307
See application file for complete search history.

(56) References Cited

U.S. PATENT DOCUMENTS

| | | |
|---|---|---|
| 2,284,025 A | 5/1942 | Ellis |
| 2,405,147 A | 8/1946 | Kauffman |
| 2,644,473 A | 7/1953 | Fox et al. |
| 2,759,485 A | 8/1956 | Guth |
| 2,987,260 A | 6/1961 | Sasnett |
| 3,044,842 A | 7/1962 | Abresch et al. |
| 3,060,946 A | 10/1962 | David |
| 3,070,216 A | 12/1962 | Robson |
| 3,126,900 A | 3/1964 | Zane et al. |
| 3,143,296 A | 8/1964 | Wall |
| 3,248,158 A | 4/1966 | Ullman, Jr. |
| 3,261,647 A * | 7/1966 | Stewart ................ A47B 88/487 384/19 |
| 3,347,612 A | 10/1967 | Bebinger |
| 3,550,755 A | 12/1970 | Noren |
| 3,556,625 A | 1/1971 | Kauffman |
| 3,672,743 A * | 6/1972 | Pompey ................ A47L 15/507 301/112 |
| 3,679,282 A * | 7/1972 | Kauffman ............. A47L 15/507 312/311 |
| 3,744,646 A | 7/1973 | Duncan et al. |

(Continued)

FOREIGN PATENT DOCUMENTS

| | | |
|---|---|---|
| AU | 1964047404 | 7/1964 |
| CA | 1080581 A | 7/1980 |

(Continued)

*Primary Examiner* — Daniel J Rohrhoff
(74) *Attorney, Agent, or Firm* — Alston & Bird LLP

(57) ABSTRACT

A wire basket assembly comprises a wire basket comprising a plurality of coated wires; a wheel comprising an axle opening; and a bushing. The bushing comprises a cylindrical axle portion and a plurality of protrusions. The axle portion comprises (a) an outer surface about which a wheel may rotate and (b) a central opening defined by an internal surface of the axle portion. The plurality of protrusions (a) extend from the internal surface toward a primary axis of the axle portion and (b) are spaced apart about the circumference of the central opening. The wheel is disposed about the axle portion. A coated wire of the plurality of coated wires is secured within the central opening by the plurality of protrusions such the bushing is secured to the coated wire. The plurality of protrusions grip the coated wire via an interference fit.

20 Claims, 8 Drawing Sheets

(56) References Cited

U.S. PATENT DOCUMENTS

| | | | |
|---|---|---|---|
| 3,829,191 A * | 8/1974 | Jenkins | A47L 15/507 312/228.1 |
| 3,990,756 A | 11/1976 | Han | |
| 4,019,794 A * | 4/1977 | Rowe | A47L 15/507 312/311 |
| 4,057,872 A * | 11/1977 | Schmidt | B60B 33/0002 16/29 |
| 4,097,099 A | 6/1978 | Spiegel | |
| 4,402,556 A * | 9/1983 | Schwind | F16C 13/006 384/281 |
| 4,449,765 A * | 5/1984 | Lampman | A47L 15/507 16/267 |
| 5,061,020 A | 10/1991 | Ulrich | |
| 5,345,959 A * | 9/1994 | Matteson | A47L 15/507 134/201 |
| 5,409,309 A | 4/1995 | Giddings et al. | |
| 5,427,129 A | 6/1995 | Young, Jr. et al. | |
| 5,474,378 A * | 12/1995 | Smith | A47L 15/504 248/297.31 |
| 5,580,025 A | 12/1996 | Cross | |
| 5,601,195 A * | 2/1997 | Finola | A47L 15/503 211/41.8 |
| 5,605,236 A | 2/1997 | Welch | |
| 5,657,878 A | 8/1997 | Austin | |
| 5,730,301 A * | 3/1998 | Welch | A47L 15/50 211/41.1 |
| 5,860,716 A | 1/1999 | Good et al. | |
| 6,152,154 A | 11/2000 | Elgharini | |
| 6,397,863 B1 | 6/2002 | Cadima | |
| 6,533,129 B2 * | 3/2003 | Bassi | A47L 15/507 16/45 |
| 6,755,490 B2 | 6/2004 | Welch et al. | |
| 6,955,179 B2 | 10/2005 | Ecker et al. | |
| 7,001,004 B2 | 2/2006 | Bartloff et al. | |
| 7,168,578 B2 | 1/2007 | Mersch et al. | |
| 7,455,066 B2 | 11/2008 | Feddema et al. | |
| 7,775,378 B2 | 8/2010 | Tynes et al. | |
| 8,534,471 B2 | 9/2013 | Wong et al. | |
| 8,915,560 B2 | 12/2014 | Cox et al. | |
| 8,950,595 B2 | 2/2015 | Ammon | |
| 8,985,375 B2 | 3/2015 | Kohles et al. | |
| 9,526,399 B2 * | 12/2016 | Garnett | A47L 15/507 |
| 2004/0201339 A1 | 10/2004 | Dickson et al. | |
| 2005/0016941 A1 | 1/2005 | Neff et al. | |
| 2006/0140519 A1 * | 6/2006 | Fournier | F16C 13/006 384/58 |
| 2006/0237042 A1 | 10/2006 | Weaver et al. | |
| 2006/0250058 A1 | 11/2006 | Stevens et al. | |
| 2009/0038657 A1 | 2/2009 | Kang | |
| 2009/0151758 A1 * | 6/2009 | Kristensson | A47L 15/4257 134/201 |
| 2011/0147332 A1 * | 6/2011 | Breyer | B65G 9/002 212/346 |
| 2013/0152983 A1 | 6/2013 | Cox et al. | |
| 2014/0102491 A1 | 4/2014 | Bhajak et al. | |
| 2015/0114917 A1 | 4/2015 | Ammon | |
| 2016/0174805 A1 | 6/2016 | Fischer et al. | |

FOREIGN PATENT DOCUMENTS

| | | |
|---|---|---|
| CA | 2046809 C | 5/1994 |
| CA | 2097650 A1 | 12/1994 |
| CA | 2187715 C | 10/2000 |
| CA | 2166525 C | 7/2001 |
| CA | 2470751 A1 | 1/2005 |
| CA | 2468607 A1 | 6/2005 |
| CA | 2394277 C | 10/2007 |
| CA | 2587999 A1 | 11/2007 |
| CA | 2925784 A1 | 4/2014 |
| CA | 2538747 C | 8/2014 |
| DE | 20307731 U1 | 9/2004 |
| EP | 1066789 B1 | 4/2004 |
| EP | 1854395 | 11/2007 |
| EP | 1707101 B1 | 6/2014 |
| EP | 2658432 B1 | 6/2016 |
| GB | 1398222 A | 6/1975 |
| GB | 2282319 A | 4/1995 |
| KR | 2014-0017136 A | 2/2014 |
| WO | WO 2006/116384 A1 | 11/2006 |
| WO | WO 2012/089515 A1 | 7/2012 |
| WO | WO 2014/063040 A1 | 4/2014 |
| WO | WO 2014/102374 A1 | 7/2014 |

* cited by examiner

WHEEL BUSHING

FIELD

Embodiments of the present invention relate to dishwashing appliances. An example embodiment relates to a bushing for a wheel that may be used with a dish rack of a dishwasher.

BACKGROUND

Dishwashers have become an integral part of everyday household use. Consumers place dishware and other utensils onto wire baskets or dishwasher racks inside dishwashers for cleaning. The wire basket is configured to be rolled or slid along a track so that wire basket may be moved between a first position wherein the wire basket is fully inside the tub of the dishwasher and a second position wherein the wire basket is accessible for consumers to place dishware and other utensils into the basket or remove dishware and other utensils from the basket. Generally, wheels are attached to the wire basket to enable the basket to roll or slide along the track. However, as different wire baskets may have different coatings, attaching wheels to a variety of wire baskets may be difficult.

BRIEF SUMMARY

Embodiments of the present invention provide a bushing for securing a wheel to a wire basket such that the wheel may rotate about an axle portion of the bushing. In an example embodiment, the wire basket is a dishrack of a dishwasher. For example, the wire basket may be a lower dishrack of a dishwasher that is configured to roll on wheels along a track within the tub of the dishwasher and/or along the internal surface of the door of the dishwasher. In an example embodiment, the bushing is secured to a wire that extends from and/or is secured to the wire basket via an interference fitting. In an example embodiment, the wires of the wire basket, and/or the wire secured to the wire basket to which the bushing is secured, are coated wires. In an example embodiment, the bushing may be configured to secure a wheel to various wire baskets that have various coatings.

According to one aspect of the present invention, a wire basket assembly is provided. In an example embodiment, the wire basket assembly comprises a wire basket comprising a plurality of coated wires; a wheel comprising an axle opening; and a bushing. The bushing comprises a cylindrical axle portion, the axle portion comprising (a) an outer surface about which a wheel may rotate and (b) a central opening defined by an internal surface of the axle portion, and a plurality of protrusions, the plurality of protrusions (a) each extending from the internal surface toward a primary axis of the axle portion and (b) spaced apart from each other about the circumference of the central opening. The wheel is disposed about the axle portion such that the axle portion passes through the axle opening. A coated wire of the plurality of coated wires is secured within the central opening by the plurality of protrusions such the bushing is secured to the coated wire. The plurality of protrusions grip the coated wire via an interference fit In an example embodiment, an undercut of the protrusions is configured to hold the coated wire within the central opening without ripping a coating on the coated wire. In an example embodiment, the leading edge of each protrusion is located opposite the undercut and is chamfered inward. In an example embodiment, the plurality of protrusions define a gripping diameter, the coated wire defines a coating diameter and a wire diameter, the gripping diameter is less than or equal to the coating diameter, and the gripping diameter is greater than the wire diameter. In an example embodiment, the protrusions are tapered radially inward. In an example embodiment, the bushing further comprises a chamfered base disposed at a first end of the axle portion, wherein the chamfered base prevents the wheel from being removed from the bushing at the first end of the axle portion. In an example embodiment, the bushing further comprises a compressible portion disposed at a second end of the axle portion, the compressible portion being deformable between an uncompressed position and a compressed position, the compressed position being sized such that the central axis opening is slideable over the compressible portion. In an example embodiment, the compressible portion comprises a flange, the flange being sized such that when the compressible portion is in the uncompressed position, the axle opening cannot be slid over the compressible portion. In an example embodiment, each protrusion has a longitudinal dimension in the direction of the primary axis that is longer than a width of the protrusion in a circumferential direction about the internal surface. In an example embodiment, each coated wire comprises a wire and a coating about the wire and the coating is softer than the wire.

According to another aspect of the present invention, a dishwasher is provided. In an example embodiment, the dishwasher comprises a tub defined at least in part by a first side wall and a second side wall disposed opposite the first side wall; a door configured to selectively enclose an opening in the tub; and a wire basket assembly. The wire basket assembly comprises a wire basket comprising a plurality of coated wires; a wheel comprising an axle opening; and a bushing. The bushing comprises a cylindrical axle portion, the axle portion comprising (a) an outer surface about which a wheel may rotate and (b) a central opening defined by an internal surface of the axle portion, and a plurality of protrusions, the plurality of protrusions (a) each extending from the internal surface toward a primary axis of the axle portion and (b) spaced apart from each other about the circumference of the central opening. The wheel is disposed about the axle portion such that the axle portion passes through the axle opening. A coated wire of the plurality of coated wires is secured within the central opening by the plurality of protrusions such the bushing is secured to the coated wire. The plurality of protrusions grip the coated wire via an interference fit. The wheel is configured to roll along a track disposed on the first side wall, the second wall, and a tub-facing surface of the door.

In an example embodiment, an undercut of the protrusions is configured to hold the coated wire within the central opening without ripping a coating on the coated wire. In an example embodiment, the leading edge of each protrusion is located opposite the undercut and is chamfered inward. In an example embodiment, the plurality of protrusions define a gripping diameter, the coated wire defines a coating diameter and a wire diameter, the gripping diameter is less than or equal to the coating diameter, and the gripping diameter is greater than the wire diameter. In an example embodiment, the protrusions are tapered radially inward. In an example embodiment, the bushing further comprises a chamfered base disposed at a first end of the axle portion, wherein the chamfered base prevents the wheel from being removed from the bushing at the first end of the axle portion. In an example embodiment, the bushing further comprises a compressible portion disposed at a second end of the axle portion, the compressible portion being deformable between an uncompressed position and a compressed position, the compressed position being sized such that the central axis opening is slideable over the compressible portion. In an example embodiment, the compressible portion comprises a flange, the flange being sized such that when the compressible portion is in the uncompressed position, the axle opening cannot be slid over the compressible portion. In an example embodiment, each protrusion has a longitudinal dimension in the direction of the primary axis that is longer than a width of the protrusion in a circumferential direction about the internal surface. In an example embodiment, each coated wire comprises a wire and a coating about the wire and the coating is softer than the wire.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. The term approximately is used herein to indicate that an element is within manufacturing and/or engineering tolerances of a particular value. Like numbers refer to like elements throughout.

Example Dishwasher 10

Figure 1:
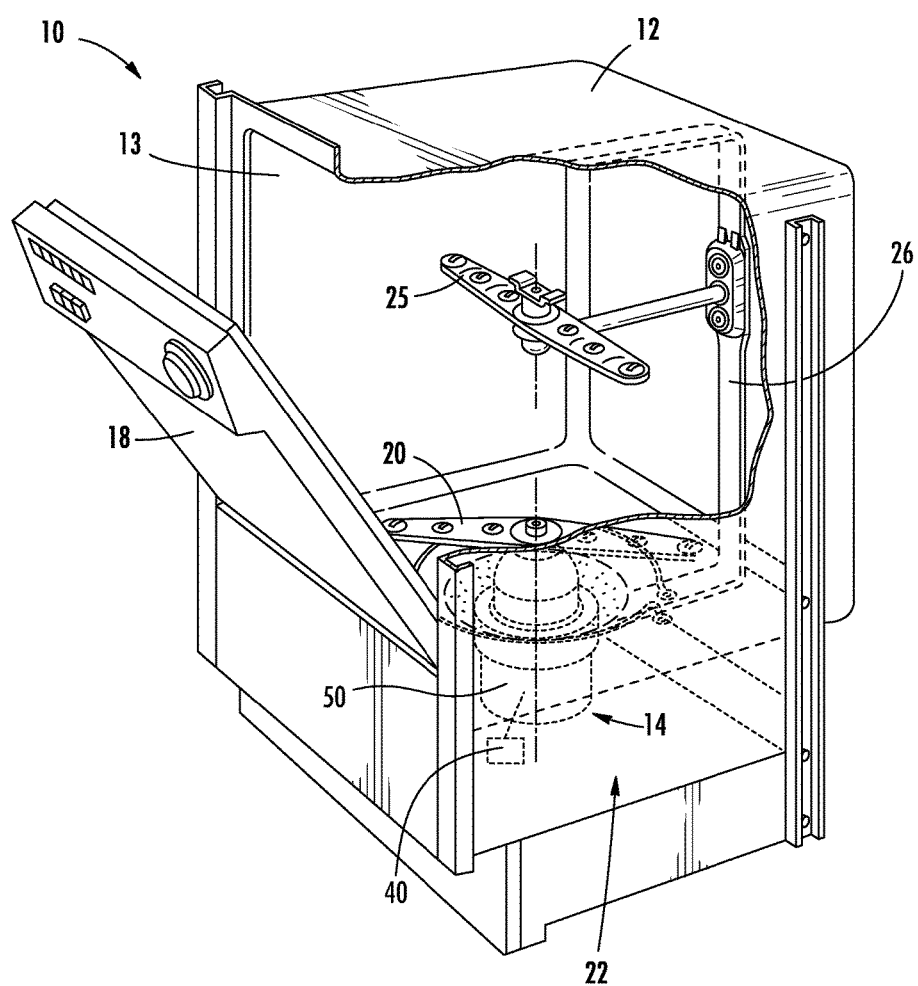
FIG. 1 is a perspective view of a dishwasher, in accordance with an example embodiment discussed herein.

FIG. 1 illustrates an example of a dishwasher 10 capable of implementing various embodiments of the present disclosure. Such a dishwasher 10 typically includes a tub 12 (partly broken away in FIG. 1 to show internal details), having a plurality of walls (e.g., side wall 13) for forming an enclosure in which dishes, utensils, and other dishware may be placed for washing. The dishwasher 10 may also include a slideable lower rack or wire basket 200 and one or more middle or upper racks (not shown) for holding the dishes, utensils, and dishware. A door 18 may be pivotably engaged with the tub 12 to selectively permit access to the interior of the tub 12. The door 18 may be configured to close in order to cover and seal the tub 12 when the dishwasher is in operation.

In an example embodiment, the lower rack or wire basket 200 may be configured to slide or roll on wheels on a track 202 (see FIG. 2) that extends along one or more of the side walls 13 and/or a surface of the door 18 that faces the tub 12. For example a first side wall and an opposite second side wall may comprise a track 202 for the lower rack or wire basket 200 to be slid and/or rolled along. The tub-facing surface of the door 18 (e.g., the surface of the door 18 that faces and/or is opposite a back side wall 13 of the tub 12 that is neither the first sidewall nor the second sidewall when the door 18 is in the closed position) may further comprise a track 202 for the lower rack or wire basket 200 to be slid and/or rolled along. For example, the wire basket 200 may be configured to be roll or slide along the track 202 so that wire basket 200 may be moved between a first position wherein the wire basket 200 is fully inside the tub 12 of the dishwasher 10 and a second position wherein the wire basket 200 is accessible for consumers to place dishware and other utensils into the basket 200 or remove dishware and other utensils from the basket 200.

The tub 12 may include a sump 14 in which wash fluid or rinse fluid (herein collectively referred to as wash fluid) is collected, typically under the influence of gravity. The wash fluid may be pumped by a circulation pump 50 (such as through circulation conduit 26) to one or more spray arms (e.g., lower spray arm 20 and/or middle spray arm 25) mounted in the interior of the tub 12 for spraying the wash fluid, under pressure, onto the dishes, utensils, and other dishware contained therein.

The dishwasher 10 may also comprise a controller 40 that may be in communication with one or more of the operational components of the dishwasher 10. For example, the controller 40 may be in communication with the circulation pump 50 and may be configured to selectively operate the circulation pump 50 to pump wash fluid to at least one spray arm and/or spray jet. In some embodiments, the controller 40 may comprise a processor or other computing means such that operations can be performed in the dishwasher. Additionally or alternatively, the controller 40 may comprise a memory for storage of data such as routines for operation of the dishwasher 10. In some embodiments, the controller 40 may be housed in the lower end 22 of the dishwasher 10.

Example Wire Basket 200

Figure 2:
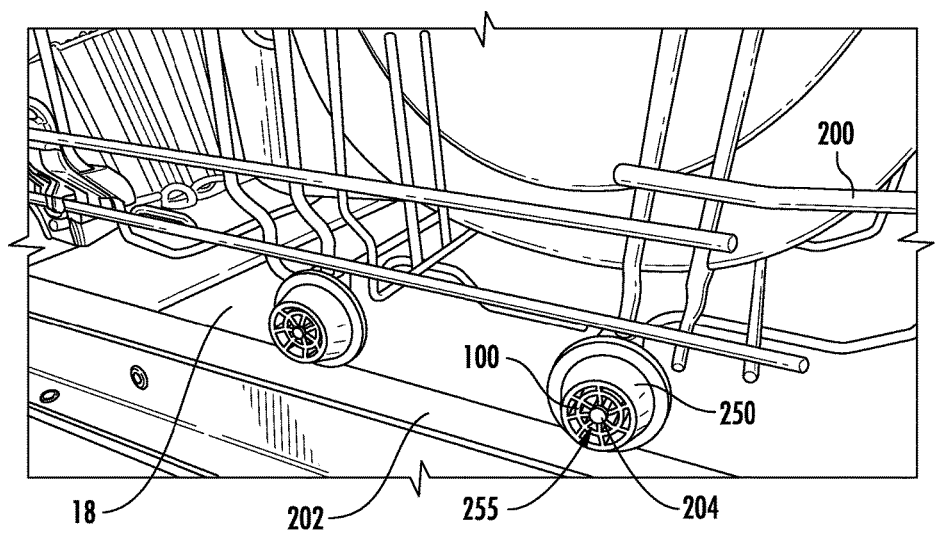
FIG. 2 is a perspective view of bushing secured to a wire basket, in accordance with some embodiments discussed herein.
Figure 2A:
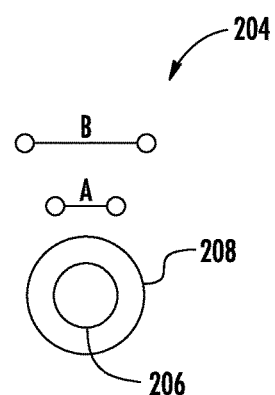
FIG. 2A is a cross-sectional view of a wire of a wire basket, in accordance with some embodiments discussed herein.

FIG. 2 illustrates a wire basket 200 comprising a plurality of coated wires 204. For example, the plurality of coated wires 204 may form a bottom of the wire basket, one or more sides of the wire basket (e.g., four sides of the wire basket), tines and/or holding spikes within the basket for holding dishware in various positions within the wire basket, and/or the like. In an example embodiment, as shown by the coated wire cross-section view of FIG. 2A, the coated wires 204 comprise a wire 206 and a coating 208 about the wire 206. For example, the coating 208 may be a nylon, Polyvinyl chloride (PVC), or other similar coating. The wire 206 may be made of metal, or the like, and may have and/or define an external diameter referred to herein as the wire diameter a. In various embodiments, the wire diameter a may be in the open range 0.015 to 0.060 inches. In other embodiments, the wire diameter may be greater than 0.060 inches or smaller than 0.015 inches, as appropriate for the application. The coating 208 has and/or defines an external diameter referred to herein as the coating diameter b. In various embodiments, the coating diameter b may be in the open range 0.035 to 0.120 inches. In other embodiments, the coating diameter b may be smaller than 0.035 inches or greater than 0.120 inches, as appropriate for the application. In various embodiments, the coating diameter b is greater than the wire diameter a.

Example Wheel 250

Figure 3:
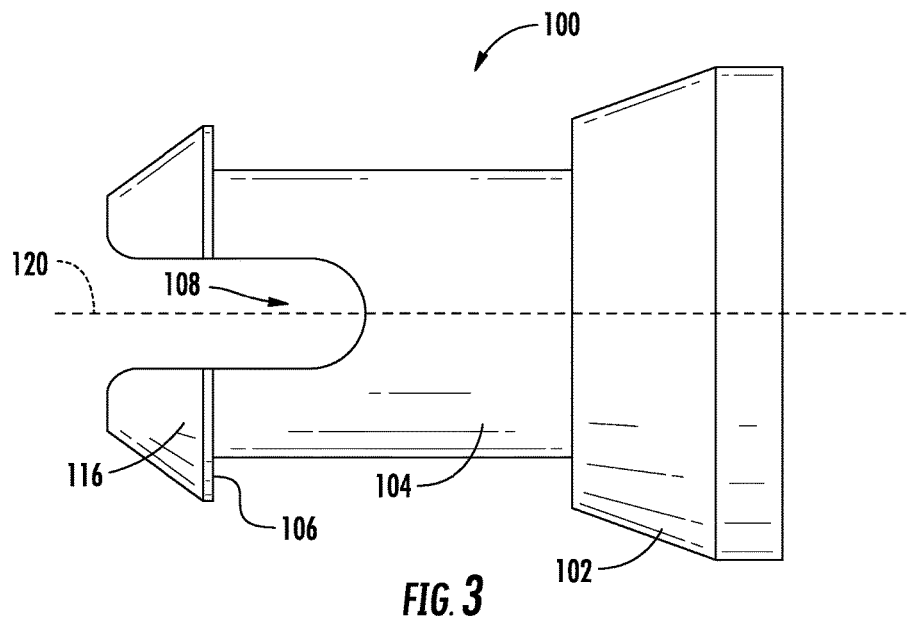
FIG. 3 is a side view of a first side of an example bushing, in accordance with some embodiments discussed herein.
Figure 4:
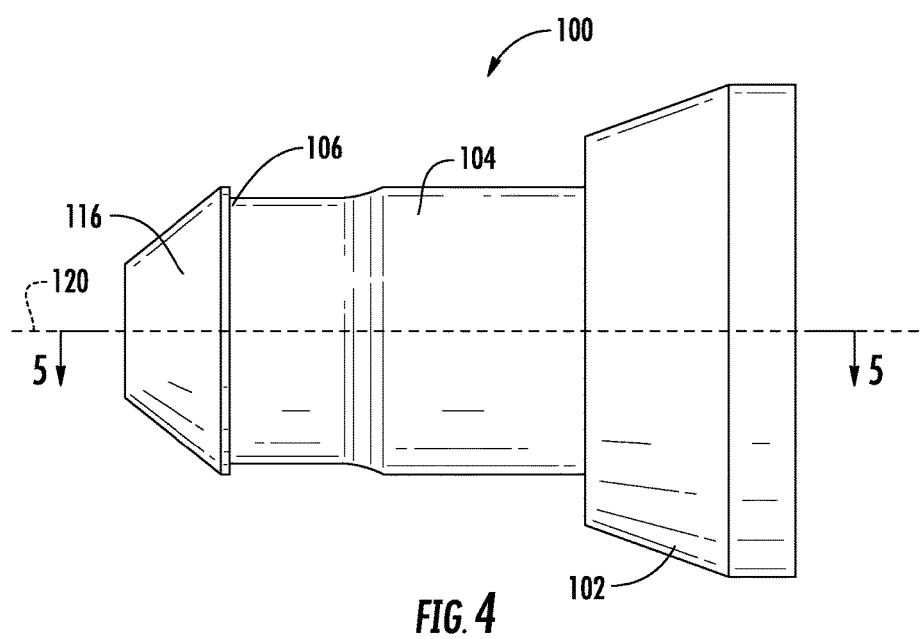
FIG. 4 is a side view of a second side of an example bushing, in accordance with some embodiments discussed herein.
Figure 5:
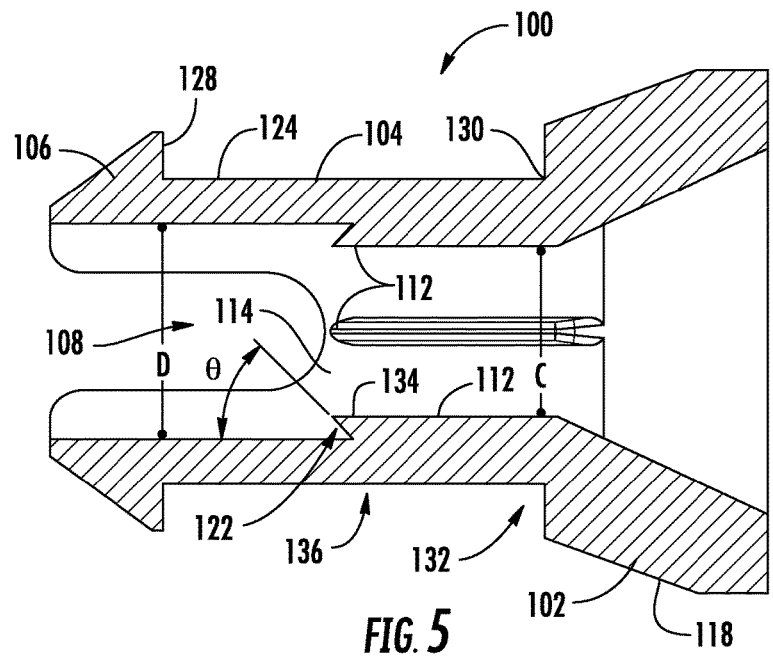
FIG. 5 is a cross-sectional view of an example bushing taken along line AA of FIG. 4, in accordance with some embodiments discussed herein.
Figure 6:
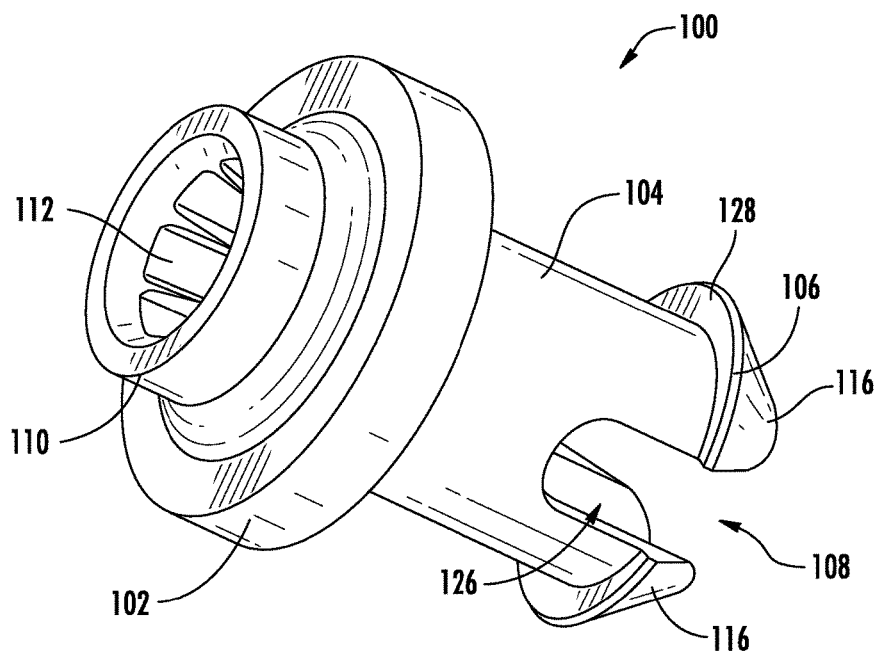
FIG. 6 is a perspective view of an example bushing, in accordance with some embodiments discussed herein

In various embodiments, one or more wheels 250 may be secured to wire basket 200. In various embodiments, each wheel 250 is secured to the wire basket 200 by a bushing 100. For example, a wheel 250 may be disposed about the bushing 100. For example, a cylindrical axle portion 104 of the bushing 100 (see, for example, FIG. 3) may pass through the central axle opening 255 of the wheel 250. The bushing 100 may then be secured to a coated wire 204 of the plurality of coated wires 204. In an example embodiment, the one or more wheels 250 may facilitate the wire basket 200 rolling and/or sliding along the track 202. For example, the wheel 250 may be configured to roll and/or slide along the track 202 of the internal surface of the dishwasher 10 door 18 and/or the first and second side walls 13.

Example Bushing 100

FIGS. 3-12 show various views of example embodiments of a bushing 100. In various embodiments, the bushing 100 is configured to be secured to a coated wire 204 of a wire basket 200. For example, the bushing 100 may be secured to a coated wire 204 of a wire basket 200 via an interference fitting, as described in more detail below. In an example embodiment, the bushing 100 is configured to secure a wheel 250 to the wire basket 200 such that the wheel 250 may freely rotate about a primary axis 120 of the bushing 100.

In various embodiments, the bushing 100 comprises an axle portion 104, a base 102, and a compressible portion 106. In an example embodiment, the base 102 is disposed at a first end 132 (labelled in FIG. 5) of the axle portion 104 and the compressible portion 106 is disposed at a second end 136 (labelled in FIG. 5) of the axle portion 104 that is opposite the first end 132. In an example embodiment, the axle portion 104 is a hollow cylinder and the height and/or axis of the hollow cylinder defines the primary axis 120 of the bushing 100.

In an example embodiment, the base 102 is disposed at the first end 132 of the axle portion 104. In various embodiments, the base 102 is configured to retain the wheel 250 about the axle portion 104. For example, the base 102 may be sized such that the base 102 cannot pass through the central axle opening 250. For example, at least one dimension of the base 102 in a plane perpendicular to the primary axis 120 may be greater than the diameter of the central axle opening 250. For example, the base 102 may comprise a flange 130 (labelled in FIG. 5) configured and/or sized to prevent the central axle opening 250 from passing over the base 102. For example, the flange 130 may be sized to retain the wheel 250 about the axle portion 104. In an example embodiment, the base 102 may be centered about the primary axis 120 of the bushing 100. In an example, the base 102 has a circular cross-section in a plane that is perpendicular to the primary axis 120. In an example embodiment, the base 102 comprises one or two chamfered surfaces 118 (labelled in FIG. 5). For example, a surface of the base 102 that faces the axle portion 104 may be a chamfered surface 118. For example, a surface of the base 102 that faces away from axle portion 104 may be a chamfered, curved, or sloping surface 148. In such embodiments, the protrusions 112 (described herein) may include a chamfered leading edge 138 at the first end 132 of the bushing 100 that aligns with the chamfered surface of the base 102. In an example embodiment, the surface of the base 102 that faces away from the axle portion 104 may comprise an extension 110 or other feature that is not a chamfered surface.

In various embodiments, the axle portion 104 is a hollow cylinder having the base 102 attached to a first end 132 thereof. For example, the axle portion 104 comprises an outer surface 124 and an internal surface 114. The outer surface 124 may be configured to have a central axle opening 255 of a wheel 250 (shown in FIG. 2) thereabout and/or in contact therewith. The internal surface 114 may comprise a plurality of protrusions 112 extending radially inward from the internal surface toward the primary axis 120. In an example embodiment, the internal surface 114 comprises four protrusions 112 that extend radially inward and that are evenly spaced about the internal surface 114. For example, in an example embodiment, the angle measured from the primary axis 120 between a first protrusion 112 and a second protrusion 112 that is adjacent the first protrusion, is 90 degrees. In example embodiments, the internal surface 114 comprises six or eight protrusions 112 that are evenly spaced about the internal surface 114. In some embodiments, the protrusions 112 may have a longitudinal dimension in the direction of the primary axis 120 that is longer than a width in the circumferential direction about the internal surface 114. In such embodiments, a narrow cross section of the protrusions 112 may engage the coated wire 204 during insertion while a wide cross section of the protrusions 112 (e.g., the cross section when viewed in the longitudinal dimension) resists rotation of the bushing relative to the wire.

Figure 7:
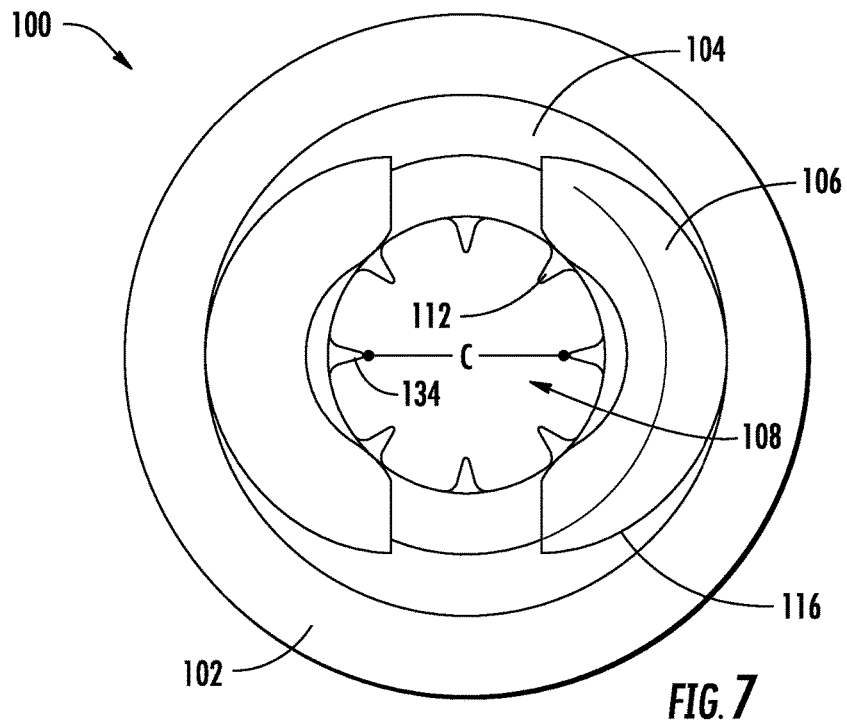
FIG. 7 is a bottom view of an example bushing, in accordance with some embodiments discussed herein.
Figure 8:
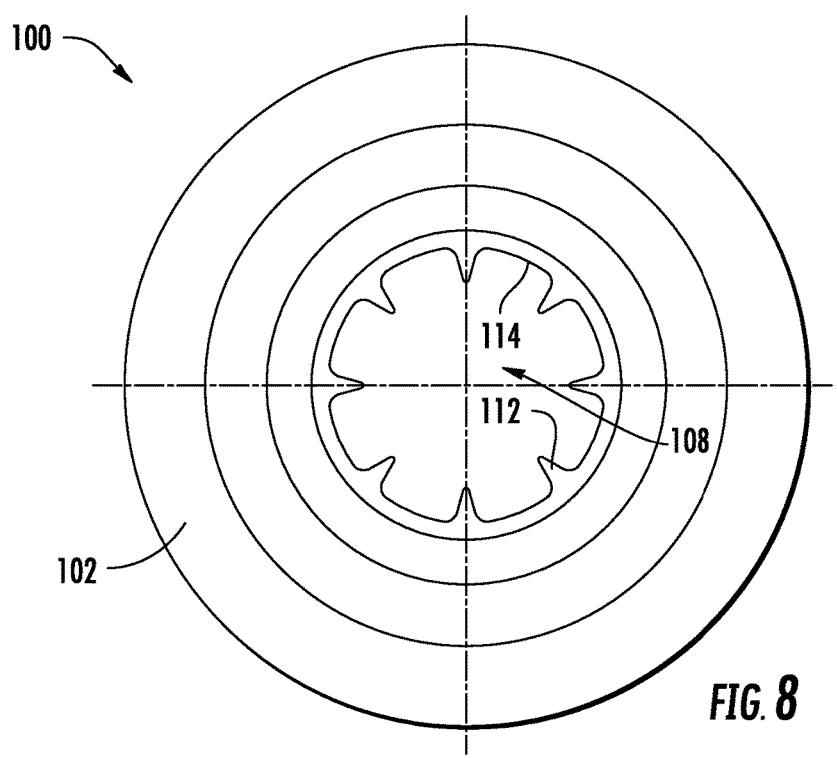
FIG. 8 is a top view of an example bushing, in accordance with some embodiments discussed herein.
Figure 9:
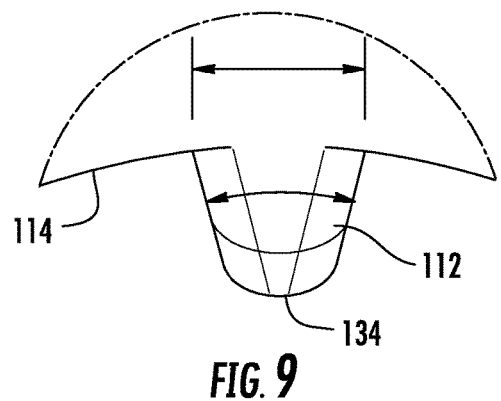
FIG. 9 is a cross-sectional view of a protrusion, in accordance with some embodiments discussed herein.
Figure 10:
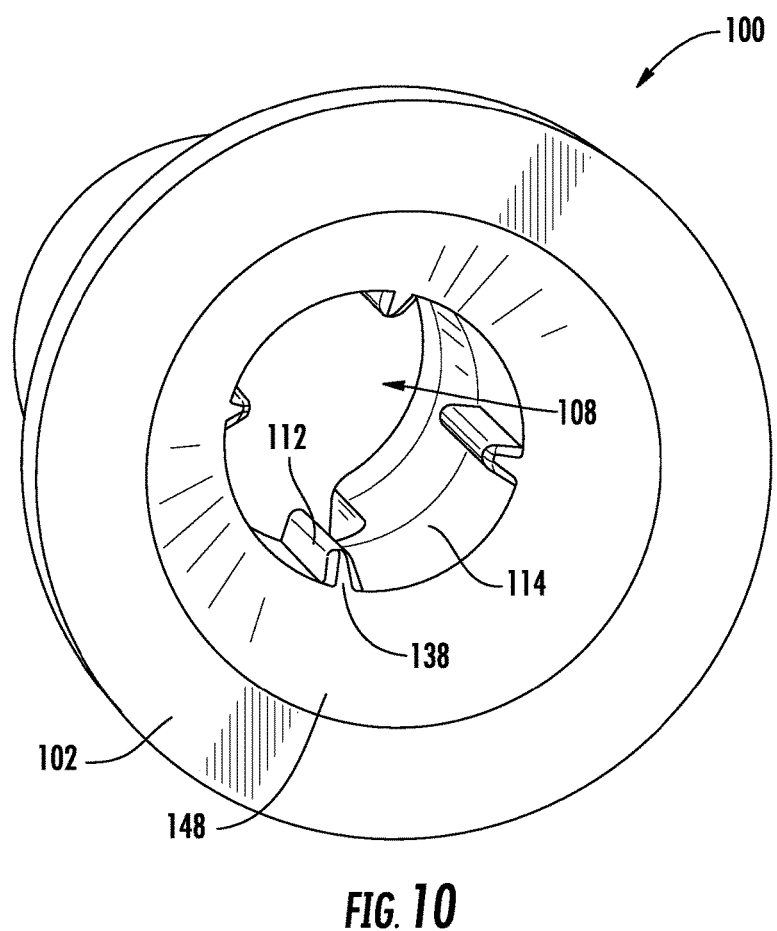
FIG. 10 is a perspective top view of an example bushing, in accordance with some embodiments discussed herein.
Figure 11:
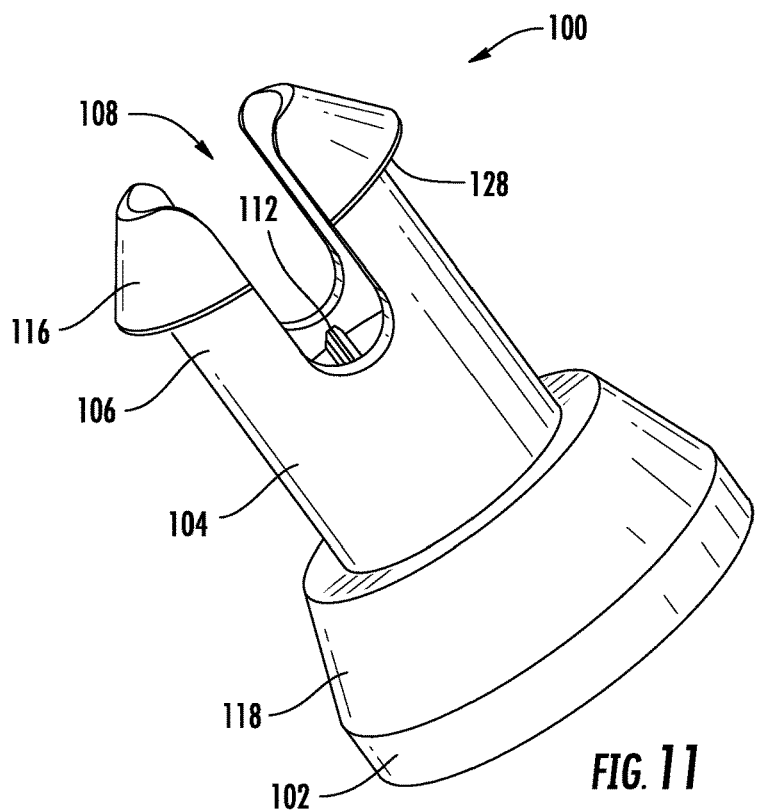
FIG. 11 is a perspective side view of an example bushing, in accordance with some embodiments discussed herein.
Figure 12:
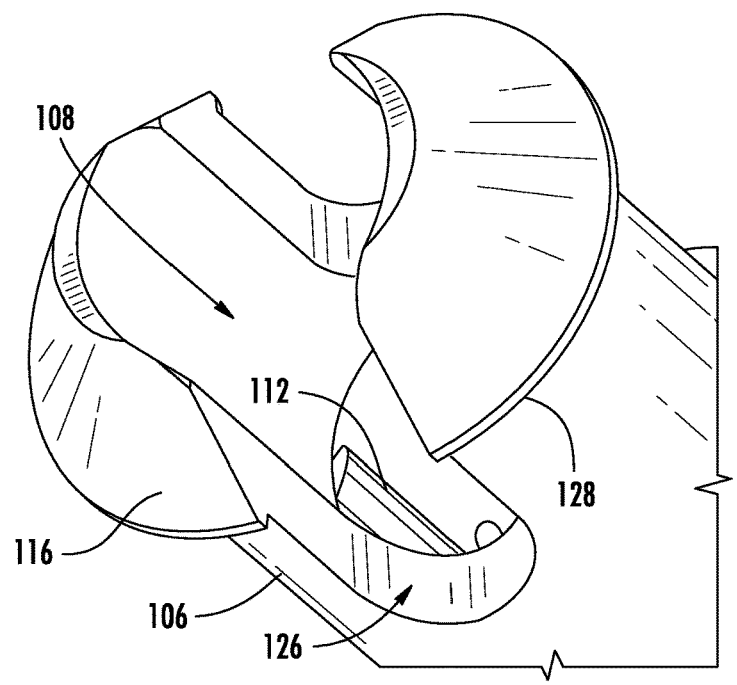
FIG. 12 is a perspective view of the compressible portion of an example bushing, in accordance with some embodiments discussed herein.

The protrusions 112 extend radially inward from the internal surface 114 toward the primary axis 120. In an example embodiment, the protrusions 112 are tapered as they extend from the internal surface toward the primary axis 120. For example, as a protrusion 112 extends from the internal surface, the protrusion 112, may taper to a tip. In various embodiments, the tip may be pointed or rounded. For example, FIG. 9 illustrates a cross section of an example protrusion 112 in a direction perpendicular to the primary axis 120. In an example embodiment, for each first protrusion 112, a second protrusion 112 is located directly opposite. For example, a tip 134 of a first protrusion 112, a point along the primary axis 120, and a tip 134 of a second protrusion 112 opposite the first protrusion defines a straight line termed herein as the gripping diameter c, as shown in FIG. 7. In embodiments for which the protrusions 112 are not disposed exactly opposite one another across the central opening 108 relative to the axis 120 (e.g., for configurations using an odd number of protrusions), the gripping diameter c may be defined as the external diameter of a cylindrical object whose outer surface contacts the tips 134 of the protrusions 112. In an example embodiment, the gripping diameter c is greater than the wire diameter a and equal to or less than the coating diameter b, such that the protrusions 112 grip the coating without contacting or exposing the wire. For example, the gripping diameter c may be configured such that the protrusions 112 cause the coated wire 204 to be centered within the central opening 108 when the coated wire 204 is inserted into the central opening 108. The gripping diameter c may be configured such that the protrusions 112 retain the coated wire 204 within the central opening 108 via an interference fit. In various embodiments, the gripping diameter c may be configured such that the bushing 100 may be used to attach or secure a wheel 250 to various wire baskets 200 that have various coatings and/or coatings with various coating diameters.

In various embodiments, one or more of the plurality of protrusions 112 may comprise an undercut 122. For example, in an example embodiment, each of the plurality of protrusions may comprise an undercut 122, which may grip the coating to prevent the wheel from backing off the rack wire after insertion. For example, each protrusion 112, may extend outward from the internal surface 114 toward the primary axis 120 and extend along the internal surface in a direction that is parallel to the primary axis 120 from a first end 132 of the axle portion 104 toward the second end 136 of the axle portion 104 (e.g., the longest dimension of the protrusion 112 may extend parallel to the axis 120). The undercut 122 may be disposed at the position where the protrusion 112 terminates at the second end 136 of the axle portion 104. For example, the undercut 122 may be an angled opening between the internal surface 114 and a tip 134 of the protrusion 112. In various embodiments, the undercut 122 is defined by an undercut angle θ. In an example embodiment, the undercut angle θ is approximately 45 degrees. In an example embodiment, the undercut angle θ is in the range of 40 to 50 degrees. In various embodiments, the undercut angle θ may be (a) greater than 50 degrees and less than 90 degrees or (b) less 40 degrees and greater than 0 degrees. In an example embodiment, the undercut 122 may be configured to aid in gripping the coated wire 204 such that coated wire 204 is retained within the central opening 108. For example, the undercut 122 may be configured to aid in gripping the coated wire 204 such that the coating 208 is not damaged while the bushing is also prevented from backing off the coated wire 204. For example, the undercut 122 and the protrusions 112 may be configured so as to not rip or cut the coating 208 such that the wire 206 is exposed to water and/or the like when the dishwasher 10 is operated. In some other embodiments, the undercut 122 may pierce the coating to a depth less than the position of the wire (e.g., so that the coating is securely gripped while the wire is not exposed to the interior of the wash chamber).

In various embodiments, the bushing 100 comprises a compressible portion 106 disposed at the second end 136 of the axle portion 104. In an example embodiment, the compressible portion 106 comprises two or more fingers 116 separated by gaps 126. In an example embodiment, when a compressing force is not applied to the two or more fingers 116, the compressible portion 106 is maintained in an uncompressed position. In an example embodiment, when pressure and/or a force is applied to the two or more fingers 116 toward the primary axis 120, the compressible portion 106 may be deformed into a compressed position. In an example embodiment, when the compressible portion 106 is in the compressed position, a wheel 250 may be slid over the compressible portion 106, such that the axle opening 255 may be positioned about the axle portion 104. The fingers 116 may comprise a flange 128 configured to retain the wheel 250 on the axle portion 104. For example, the flange 128 may be sized such that the flange 128 prevents the axle opening 255 from sliding off the second side 136 of the axle portion 136. In an example embodiment, the surface of a finger 116 may slope from the flange 128 to the end of the bushing 100 such that the end of the finger 116 is wedge-shaped. For example, the wedge shape of the finger 116 may allow a wheel 250 to be slid onto the axle portion 104 by allowing the axle opening 255 to engage the wedge-shaped fingers 116 to apply the compressing force causing the compressible portion 106 to be deformed from the uncompressed position to the compressed position. Once, the axle opening 255 has passed over the flange 128, the compressible portion 106 may return to the uncompressed position and the flange 128 may act to retain the wheel 250 about the axle portion 104.

In some embodiments, the bushing 100 and protrusions 112 may be made of a more rigid material than the coating 208 on the wire 206. In some embodiments, the bushing 100 and protrusions 112 may be made of a softer material than the wire 206. The coating 208 may be made of a softer material than the wire 206.

Example Method of Securing a Wheel to a Wire Basket

Figure 13:
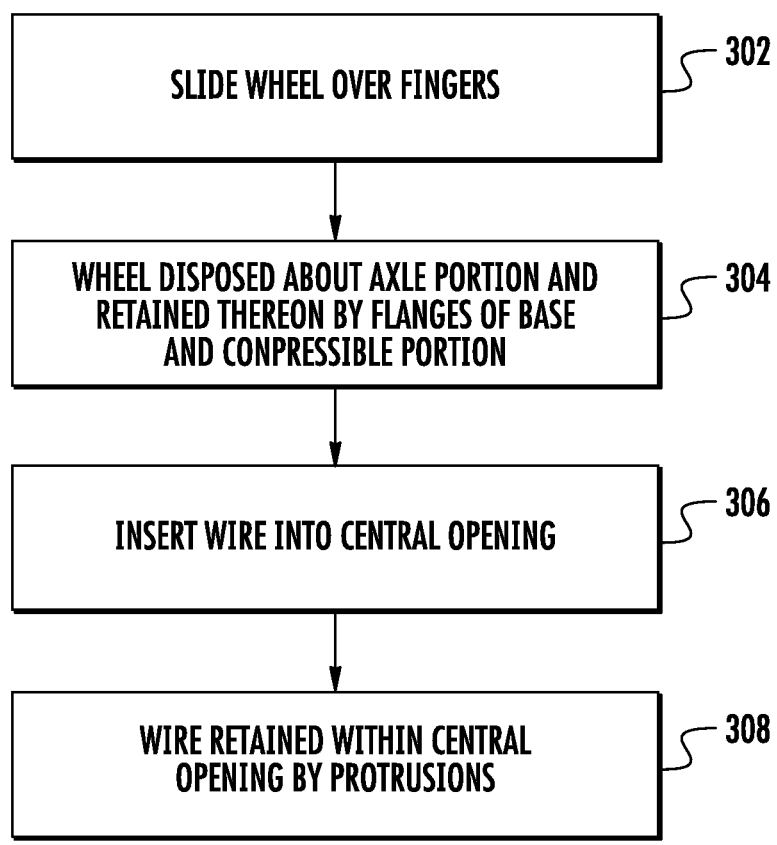
FIG. 13 provides a flowchart illustrating processes and procedures of securing a wheel to a wire basket, in accordance with some embodiments discussed herein.

FIG. 13 provides a flowchart illustrating processes and procedures for securing a wheel 250 to a wire basket 200 using a bushing 100, in accordance with various embodiments of the present invention.

Starting at block 302, a wheel 250 is slid over the fingers 116 of a bushing 100. For example, the wheel 250 may be pressed against the wedge-shaped fingers 116 of the bushing 100 such that the ends of the wedge-shaped fingers 116 are positioned within the central opening 255. As the wheel 250 is pressed against the wedge-shaped fingers 116, the edge of the central opening 255 may exert a compressing force onto the fingers 116 causing the compressible portion 106 of the bushing 100 to be deformed from an uncompressed position to a compressed position. The central opening 255 may then slide over the compressible portion 106 and the compressible portion 106 may return to the uncompressed position.

At block 304, the wheel 250 is disposed and/or positioned about the axle portion 104 of the bushing 100. For example, the flanges 128 and 130 may retain the wheel 250 about the axle portion 104. For example, the flanges 128 and 130 may prevent the base portion 102 and/or the compressible portion 106 from passing through the central opening 255 and thereby retain the wheel 250 about the axle portion 104.

At block 306, a wire 204 of the wire basket 200 is inserted into the central opening 108. For example, a wire 204 of the wire basket 200 may be inserted into the central opening 108 from the second end 136 of the axle portion 104 and toward the first end 132 of the axle portion 104. As the wire 204 is inserted into the central opening, the protrusions 112 of the internal surface 114 of the axle portion 104 may cause the wire 204 to be centered within the central opening 108. In an example embodiment, the wire basket 200 is a dishrack of a dishwasher 10.

At block 308, the wire 204 of the wire basket 200 is retained within the central opening 108 by the protrusions 112. For example, the plurality of protrusions 112 may define a gripping diameter c that is equal to or less than the coating diameter b of the coating 208 on the wire 204. Additionally, the protrusions 112 may comprise an undercut 122 that additionally grips the coated wire 204. Thus, the protrusions 112 may grip the coated wire 204 via an interference fit.

Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included herein. Although specific terms are employed herein, they are used in a generic and descriptive sense only and not for purposes of limitation.

The invention claimed is:

1. A wire basket assembly comprising:
   a wire basket comprising a plurality of coated wires;
   a wheel comprising an axle opening; and
   a bushing, the bushing comprising:
      a cylindrical axle portion, the axle portion comprising (a) an outer surface about which a wheel may rotate and (b) a central opening defined by an internal surface of the axle portion, and
      a plurality of protrusions, the plurality of protrusions (a) each extending from the internal surface toward a primary axis of the axle portion and (b) spaced apart from each other about the circumference of the central opening,
   wherein:
      the wheel is disposed about the axle portion such that the axle portion passes through the axle opening,
      a coated wire of the plurality of coated wires is secured within the central opening by the plurality of protrusions such the bushing is secured to the coated wire, and
      the plurality of protrusions grip the coated wire via an interference fit.

2. The wire basket assembly of claim 1, wherein an undercut of the protrusions is configured to hold the coated wire within the central opening without ripping a coating on the coated wire.

3. The wire basket assembly of claim 2, wherein the leading edge of each protrusion is located opposite the undercut and is chamfered inward.

4. The wire basket assembly of claim 1, wherein:
   the plurality of protrusions define a gripping diameter,
   the coated wire defines a coating diameter and a wire diameter,
   the gripping diameter is less than or equal to the coating diameter, and
   the gripping diameter is greater than the wire diameter.

5. The wire basket assembly of claim 1, wherein the protrusions are tapered radially inward.

6. The wire basket assembly of claim 1, wherein the bushing further comprises a chamfered base disposed at a first end of the axle portion, wherein the chamfered base prevents the wheel from being removed from the bushing at the first end of the axle portion.

7. The wire basket assembly of claim 1, wherein the bushing further comprises a compressible portion disposed at a second end of the axle portion, the compressible portion being deformable between an uncompressed position and a compressed position, the compressed position being sized such that the central axis opening is slideable over the compressible portion.

8. The wire basket assembly of claim 7, wherein the compressible portion comprises a flange, the flange being sized such that when the compressible portion is in the uncompressed position, the axle opening cannot be slid over the compressible portion.

9. The wire basket assembly of claim 1, wherein each protrusion has a longitudinal dimension in the direction of the primary axis that is longer than a width of the protrusion in a circumferential direction about the internal surface.

10. The wire basket assembly of claim 1, wherein each coated wire comprises a wire and a coating about the wire and the coating is softer than the wire.

11. A dishwasher comprising:
    a tub defined at least in part by a first side wall and a second side wall disposed opposite the first side wall;
    a door configured to selectively enclose an opening in the tub; and
    a wire basket assembly, the wire basket assembly comprising:
       a wire basket comprising a plurality of coated wires;
       a wheel comprising an axle opening; and
       a bushing, the bushing comprising:
          a cylindrical axle portion, the axle portion comprising (a) an outer surface about which a wheel may rotate and (b) a central opening defined by an internal surface of the axle portion, and
          a plurality of protrusions, the plurality of protrusions (a) each extending from the internal surface toward a primary axis of the axle portion and (b) spaced apart from each other about the circumference of the central opening,
       wherein:
          the wheel is disposed about the axle portion such that the axle portion passes through the axle opening,
          a coated wire of the plurality of coated wires is secured within the central opening by the plurality of protrusions such that the bushing is secured to the coated wire,
          the plurality of protrusions grip the coated wire via an interference fit; and
          the wheel is configured to roll along a track disposed on the first side wall, the second wall, and a tub-facing surface of the door.

12. The dishwasher of claim 11, wherein an undercut of the protrusions is configured to hold the coated wire within the central opening without ripping a coating on the coated wire.

13. The wire basket assembly of claim 12, wherein the leading edge of each protrusion is located opposite the undercut and is chamfered inward.

14. The dishwasher of claim 11, wherein:
    the plurality of protrusions define a gripping diameter,
    the coated wire defines a coating diameter and a wire diameter,
    the gripping diameter is less than or equal to the coating diameter, and
    the gripping diameter is greater than the wire diameter.

15. The dishwasher of claim 11, wherein the protrusions are tapered radially inward.

16. The dishwasher of claim 11, wherein the bushing further comprises a chamfered base disposed at a first end of the axle portion, wherein the chamfered base prevents the wheel from being removed from the bushing at the first end of the axle portion.

17. The dishwasher of claim 11, wherein the bushing further comprises a compressible portion disposed at a second end of the axle portion, the compressible portion being deformable between an uncompressed position and a compressed position, the compressed position being sized such that the central axis opening is slideable over the compressible portion.

18. The dishwasher of claim 17, wherein the compressible portion comprises a flange, the flange being sized such that when the compressible portion is in the uncompressed position, the axle opening cannot be slid over the compressible portion.

19. The dishwasher of claim 11, wherein each protrusion has a longitudinal dimension in the direction of the primary axis that is longer than a width of the protrusion in a circumferential direction about the internal surface.

20. The dishwasher of claim 11, wherein each coated wire comprises a wire and a coating about the wire and the coating is softer than the wire.

\* \* \* \* \*